(12) United States Patent
Walisko et al.

(10) Patent No.: US 12,537,416 B2
(45) Date of Patent: Jan. 27, 2026

(54) STATOR OF AN ELECTRIC MOTOR FOR DRIVING A REFRIGERANT COMPRESSOR

(71) Applicant: Hanon Systems, Daejeon (KR)

(72) Inventors: David Walisko, Hürth (DE); Bernd Guntermann, Lennestadt (DE); Michael Haag, Cologne (DE)

(73) Assignee: HANON SYSTEMS, Daejeon (KR)

( * ) Notice: Subject to any disclaimer, the term of this patent is extended or adjusted under 35 U.S.C. 154(b) by 34 days.

(21) Appl. No.: 18/549,699

(22) PCT Filed: Aug. 24, 2022

(86) PCT No.: PCT/KR2022/012687
§ 371 (c)(1),
(2) Date: Sep. 8, 2023

(87) PCT Pub. No.: WO2023/033451
PCT Pub. Date: Mar. 9, 2023

(65) Prior Publication Data
US 2024/0313604 A1   Sep. 19, 2024

(30) Foreign Application Priority Data

Aug. 31, 2021   (DE) .................. 10 2021 122 482.9

(51) Int. Cl.
*H02K 5/22*        (2006.01)
*H02K 3/34*        (2006.01)
(Continued)

(52) U.S. Cl.
CPC .............. *H02K 5/225* (2013.01); *H02K 3/34* (2013.01); *H02K 3/522* (2013.01); *F25B 31/02* (2013.01); *H02K 2203/09* (2013.01)

(58) Field of Classification Search
CPC .......... H02K 5/225; H02K 3/34; H02K 3/345; H02K 3/522; H02K 2203/09; H02K 11/33; F25B 31/02
(Continued)

(56) References Cited

U.S. PATENT DOCUMENTS 10,680,482 B2   6/2020   Okamoto et al.
10,760,575 B2   9/2020   Seo et al.
(Continued)

FOREIGN PATENT DOCUMENTS

JP    2008-061305 A    3/2008
JP    6033582 B2       11/2016
(Continued)

*Primary Examiner* — Alexander A Singh
(74) *Attorney, Agent, or Firm* — James D. Miller; Shumaker, Loop & Kendrick, LLP (57) ABSTRACT

A stator of an electric motor for driving a refrigerant compressor including a stator core, a coil connecting device with a base plate as a support element for connecting elements, a first connecting element installed on the base plate, which is linked via connection elements to a first wire end of each coil or each coil strand and thus connects all coils or coil strands to each other, and further connecting elements installed on the base plate, each having connection elements, which are linked to second wire ends of the coils or coil strands of a phase and thus connect all coils or coil strands of this phase to each other, the coil connecting device being linked on wire ends of the wound coils or coil strands in such a way that a gap remains between base insulation and the coil connecting device.

9 Claims, 11 Drawing Sheets

(51) Int. Cl.
*H02K 3/52* (2006.01)
*F25B 31/02* (2006.01)

(58) Field of Classification Search
USPC ............................................................ 310/71
See application file for complete search history.

(56) References Cited

U.S. PATENT DOCUMENTS

| | | |
|---|---|---|
| 2007/0278876 A1 | 12/2007 | Haga et al. |
| 2012/0112582 A1* | 5/2012 | Kim .................... B62D 5/0403 |
| | | 310/71 |
| 2012/0286593 A1 | 11/2012 | Yokogawa et al. |
| 2013/0264899 A1 | 10/2013 | Goto et al. |
| 2014/0015349 A1 | 1/2014 | Chamberlin et al. |
| 2015/0188377 A1* | 7/2015 | Kim ....................... H02K 1/278 |
| | | 417/415 |

FOREIGN PATENT DOCUMENTS

| | | |
|---|---|---|
| JP | 6118152 B2 | 4/2017 |
| KR | 10-2002-0044534 A | 6/2002 |

* cited by examiner

STATOR OF AN ELECTRIC MOTOR FOR DRIVING A REFRIGERANT COMPRESSOR

CROSS REFERENCE TO RELATED PATENT APPLICATIONS

This is a U.S. national phase patent application of PCT/KR2022/0012687 filed Aug. 24, 2022 which claims the benefit of and priority to German Patent Application No. 10 2021 122 482.9 filed on Aug. 31, 2021, the entire contents of each of which are incorporated herein by reference.

TECHNICAL FIELD

The invention relates to a stator of an electric motor for driving a refrigerant compressor having a coil connecting device. The invention is suitable for use in refrigerant compressors for chemical and natural refrigerants in mobile applications.

BACKGROUND ART

Previous contacting of individual coils and phases of a stator usually has been using coil distributor rings rigidly connected to other stator parts. In case of direct contacting of the stator to a motor control unit—the inverter—this type of rigid coil distributor rings cannot be used. The necessary axial and lateral tolerance compensation for contacting is not available in this case.

The object of the invention is to provide a stator allowing for creation of the necessary axial and lateral tolerance compensation for contacting.

SUMMARY

A stator of an electric motor according to the invention for driving a refrigerant compressor comprises
- a stator core having a substantially hollow-cylindrically shaped stator yoke having coil webs arranged uniformly distributed on its inner side along its circumference and directed radially inwards with respect to its cross section, wherein conductor wires are wound around the coil webs to create coils which are divided into at least three phases, and wherein a base insulation is formed between the stator core and the wound coils, and wherein each of the wound coils or, if several of the coils are connected in series in a coil strand, each coil strand has two wire ends projecting the base insulation of the stator in the axial direction relative to the cylinder axis of the stator yoke, and
- a coil connecting device with a base plate as a support element for connecting elements, a first connecting element installed on the base plate, which is linked via connection elements to a first wire end of the wire ends axially projecting the base insulation of each coil or each coil strand and thus connects all coils or coil strands to each other, and further connecting elements installed on the base plate, each having connection elements, which are linked to second wire ends of the coils or coil strands of a phase and thus connect all coils or coil strands of this phase to each other, the coil connecting device being linked on the wire ends of the wound coils or coil strands axially projecting the base insulation in such a way that a gap remains between the base insulation and the coil connecting device.

The type of fastening and the remaining gap between the switching ring and the base insulation allow for both an axial and a lateral tolerance compensation so that the coil connecting device is also referred to as a "floating" coil connecting device, and in a preferred embodiment is also referred to as a "floating" coil connecting ring.

The advantages of the axial and lateral tolerances allow for possible direct contacting of the stator and a motor control unit (inverter). According to an advantageous embodiment of the invention, the connecting elements, which each connect the coils or coil strands of a phase to each other, also each have a connection part for a connection of the same phase to a line element forming an interface to the motor control unit (inverter). This connection part thus also allows for an electrical connection between the wire ends of the coils or coil strands and electrical line elements of the interface to the motor control unit.

Usually, the coil connecting device is filled with potting material, the potting taking place in a pre-mounted floating coil connecting device after winding and connecting the coils or coil strands to the connecting elements, in order to insulate the components from the refrigerant and also from each other. Potting may also strengthen the connecting points between the individual current-carrying elements. In this way, the coils or coil strands can be connected simultaneously via a star connection and the coils or coil strands of each phase, while sufficient space is secured and the full insulation between each current-carrying part is ensured.

According to the concept of the invention, the coils or coil strands of the stator each are connected via a first connecting element as a star point connection to coils or coil strands of the stator being operated in parallel. Preferably, a busbar connecting each coil or each coil strand of each phase to each other coil or each other coil strand and thus forming the star point connection is used for this purpose. According to an advantageous embodiment, the busbar has the basic shape of an open circular arc and, distributed uniformly along its circumference or arc length, has several radially outwardly projecting connection elements with outer ends for each receiving the first wire end of a coil or a coil strand. In this case, the total number of connection elements of such busbar corresponds to the total number of coils or coil strands of the stator, so that the busbar is able to contact all coils or coil strands of the stator via the connection elements and thus to connect them electrically to each other.

The further connecting elements can likewise be formed as busbars each having the basic shape of an open circular arc and, distributed uniformly along its circumference or arc length, has several radially outwardly projecting connection elements with outer ends each for receiving the second wire end of a coil. These busbars are designed such that they each create the connection of all coils or coil strands of a phase, so that the coils or coil strands can be operated simultaneously. Furthermore, these three busbars are preferably designed such that they each allow for a connection to an electrical line element for the connection to the motor drive control unit, the inverter.

In the case of the busbars connecting the coils or coil strands of each phase to each other, the total number of the connection elements leading to the coils or coil strands corresponds to the total number of coils or coil strands of this phase. Advantageously, the radii of the circular arc shapes of the various busbars differ, wherein the busbars are arranged such that the circular arc shapes of the various busbars either have the same center point or the center points of the circular arc shapes are positioned at least on the same axis perpendicular to the plane of the circular arc shape.

In a preferred embodiment of the invention, the busbar connecting all coils of the stator to each other and thus representing the star point connection, is placed furthest outwards in the radial direction and consequently also has a larger radius and a larger circumference, or a larger arc length than all other busbars, respectively. In addition, the open circular arc of the circular arc-shaped part of this busbar has a substantially larger center point angle and consequently also a larger circumferential angle than the open circular arcs of the other busbars. According to an embodiment of the invention, the busbar for the star point connection is even formed to be closed in a circular manner.

The other busbars being positioned further inward in the radial direction preferably have connection elements that are formed longer in the radial direction than each of the connection elements of the outer busbar. Usually, the following applies: the further inward the respective busbar is placed and the smaller the radius of the open circular arc of the busbar, the longer are the radially projecting connection elements in order to create in each case a connection to the second wire end of a coil belonging to the respective phase or of a coil strand belonging to the respective phase.

Furthermore, the busbars being formed for connecting the coils or the coil strands of a phase are advantageously designed such that they each allow for a connection to an electrical conductor for a connection to the motor drive control unit, the inverter. For this purpose, in addition to the connection elements described, each of these busbars has a radially inwardly directed connection part of the respective phase for an electrical line element of an interface to the motor drive control unit, wherein a preferably annular connection end is formed on the connection part.

According to a particularly advantageous embodiment of the invention, the base plate is designed such that it provides separate receiving spaces for receiving and supporting the connecting elements and, if appropriate, also receiving spaces for the connection parts for connecting to the line elements of the interface to the motor drive control unit. For example, corresponding circular arc-shaped receiving spaces with at least partially circular arc-shaped side walls for the busbars can be provided by depressions, wherein the at least partially circular arc-shaped side walls, provided they are respectively positioned between two adjacent busbars, simultaneously serve as partition walls between the respectively adjacent busbars. Furthermore, the base plate may have receiving spaces for the connection ends of the connection parts. The side walls advantageously also serve for supporting the connection elements and connection parts, and simultaneously are spacers for connection elements and connection parts, which are guided radially over one or more busbars, relative to these busbars. Preferably, the side walls of the receiving spaces are provided with recesses for supporting the connection elements and/or connection parts.

According to a preferred embodiment of the invention, the base plate itself has an annular shape with an outer edge on which an outer ring is located. The outer ring is advantageously a removable part so that the wire ends can be guided to the connecting elements or busbars, respectively, before assembly of the base plate with the outer ring. Here, the wire ends are preferably passed through between the outer edge of the base plate and the outer ring, so that an electrical connection of the wire ends to the connecting elements positioned on the base plate is possible. After assembly, the outer ring may act as a boundary wall, so that the entire region enclosed by the outer ring can be potted with resin.

According to a further embodiment of the invention, the annular base plate has an inner edge on which three convex projections directed inwards in the radial direction are formed. Each of these convex projections on the inner circumference of the base plate forms, together with a correspondingly curved section of an inner side wall, a receiving space for an annular connection end of one of the connection parts for an electrical line element of an interface to the motor drive control unit.

The preferred design concept of a "floating" coil connecting ring allows for connecting the coils or coil strands of each phase to each other in a simple and efficient manner. The most direct way of realizing such a complex connection of coils or coil strands, which is divided, for example, into three phases, was to design a base plate allowing for connecting all coils or coil strands to each other using busbars, but also connecting each individual phase to a line element forming the interface to the motor control unit (inverter). A first busbar is connected to the side of each coil or each coil strand and functions as a star point connection for all coils, meaning that all coils or coil strands, respectively, are connected via this element. This means that this busbar is designed such that it connects each coil or each coil strand of each phase to each other coil or each other coil strand, respectively. The other busbars, three busbars in the case of three phases, are used to create a connection assigned to a phase. These busbars are designed not only to operate all coils or coil strands of a phase simultaneously, but also to allow for a connection to an electrical conductor that is connected to the motor drive control unit.

For this type of wiring pattern, the coil connecting ring with its base plate represents an advantageous design solution. The base plate, to which a removable outer ring is preferably attached, fulfills the function of a support element for the connecting elements of the coils or coil strands and for the electrical line elements of an interface to the motor control unit.

According to a further embodiment of the invention, sealing tubes are inserted into the coil connecting device, into which an electrical line element, preferably an electrical connecting pin (E-pin) representing the interface between the stator and the inverter, is inserted, respectively. The effect of the sealing tubes is to insulate the line element within a hermetically sealed environment and to provide a seating area for an O-ring for sealing the inside of the hermetically sealed environment to the inverter.

DESCRIPTION OF DRAWINGS

Further details, features, and advantages of embodiments of the invention will become apparent from the following description of exemplary embodiments with reference to the accompanying drawings. In the drawings.

DESCRIPTION OF AN EMBODIMENT

Figure 1:
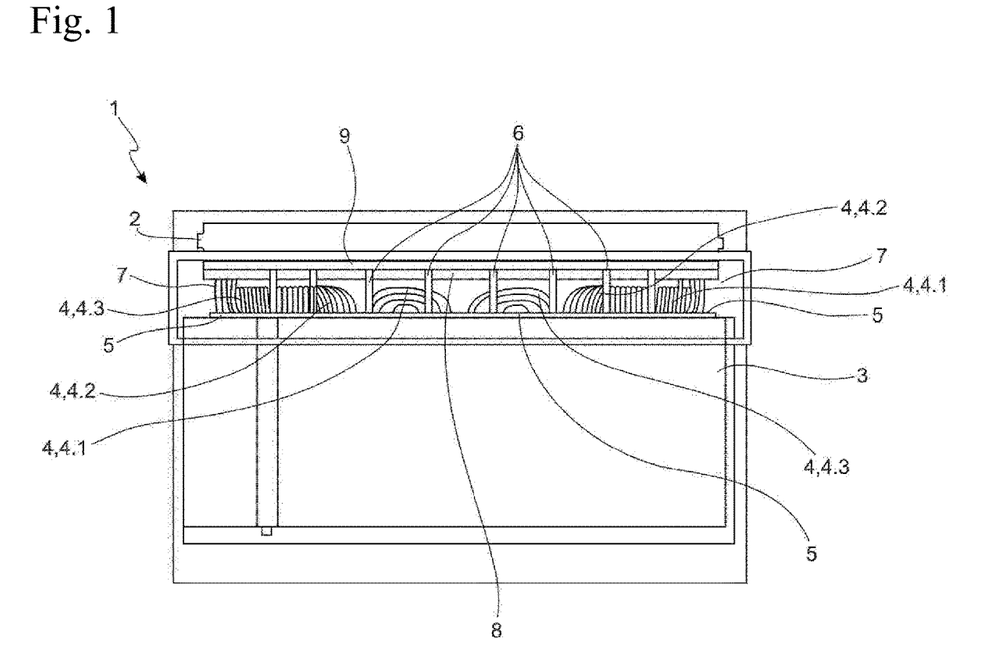
FIG. 1: shows a side view of a stator with a coil connecting device.

FIG. 1 shows a side view of a stator 1 of an electric motor for driving a refrigerant compressor, this stator being provided with a coil connecting device 2, also being referred to as a floating coil connecting ring. The stator 1 comprises a stator core 3 with a stator yoke with a shape that is substantially hollow-cylindrical, having coil webs on its inner side uniformly distributed along its circumference and directed radially inwards with respect to its cross section. Conductor wires are wound around the coil webs to create coils 4, the coils being distributed along the circumference of the stator core because of the uniformly distributed arrangement of the coil webs not shown in FIG. 1. The distribution of the coils 4 shown in FIG. 1 indicates that a total of twelve coils are arranged on the inside of the stator core. The coils 4 are divided into three phases 4.1, 4.2, 4.3, so that each phase consists of four coils. A base insulation 5 is formed between the stator core 3 and the wound coils 4, each of the wound coils 4 having two wire ends 6 projecting the base insulation 5 of the stator 1 in the axial direction relative to the cylinder axis of the hollow-cylindrically shaped stator yoke. The coil connecting device 2 is linked to the wire ends 6 of the wound coils 4 axially projecting the base insulation in such a way that a defined gap 7 remains between the base insulation 5 and the coil connecting device 2. Interconnections with several coils being connected in series are also conceivable. In such a configuration, which is not shown, not every coil has two wire ends projecting the base insulation in the axial direction, but rather the respective coil strand.

The coil connecting device 2 comprises a substantially annular base plate 8 as a support element for connecting elements not shown in FIG. 1, which are connected to the axially projecting wire ends 6 of the coils. Here, the wire ends 6 are passed through between an outer edge of the base plate 8 and an outer ring 9 limiting the circumference of the coil connecting device 2, so that an electrical connection of the wire ends 6 to the connecting elements positioned on the base plate 8 is possible. The outer ring 9 is preferably designed as a part which can be removed from the base plate 8, so that the wires or the wire ends 6, respectively, when mounting the coil connecting device 2, can be guided easily first past the outer edge of the base plate 8 to the connecting elements before the outer ring 9 is attached to the outer edge of the base plate 8. After assembly of the coil connecting device 2, the outer ring 9 also acts as a boundary wall for resin potting the entire region enclosed by the outer ring 9.

Figure 2:
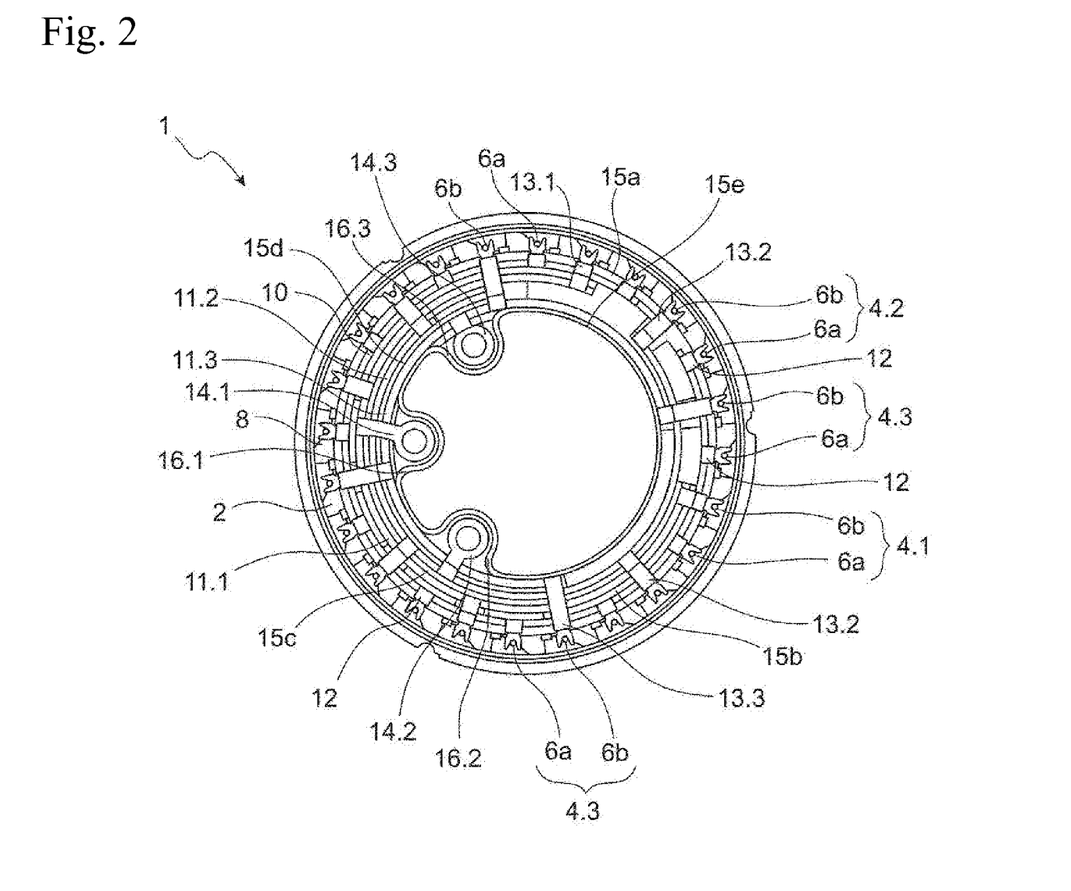
FIG. 2: shows a plan view of the coil connecting device linked on the wire ends of the coils of the stator.

FIG. 2 shows a plan view of the front face of the stator 1 and of the coil connecting device 2 linked on the wire ends 6 of the coils of the stator, being formed in the shape of a coil connecting ring. The design concept of the floating coil connecting ring 2 makes it possible to connect the coils of each phase to each other in the simplest and most effective manner. The most direct path for implementing such a complex connection of coils, which are separated into three phases 4.1; 4.2; 4.3, consists in using busbars 10, 11.1, 11.2, 11.3 as connecting elements and designing the base plate 8 in such a way that all coils can be connected to each other using the busbars, but also each phase 4.1; 4.2; 4.3 can be connected to a line element forming the interface to the motor control unit (inverter).

Each of the busbars 10, 11.1, 11.2, 11.3 has the shape of an open circular arc with radially outwardly projecting connection elements 12, 13.1, 13.2, 13.3, wherein the radii of the circular arc shapes of the various busbars 10, 11.1, 11.2, 11.3 are differing. The busbars 10, 11.1, 11.2, 11.3 are arranged in such a way that the circular arc shapes of the various busbars 10, 11.1, 11.2, 11.3 either have the same center point or the center points of the circular arc shapes are positioned at least on the same axis perpendicular to the viewing plane of FIG. 2. According to FIG. 2, the radially projecting connection elements 12, 13.1, 13.2, 13.3 are formed by means of connection elements each having a fork-shaped end. The busbar 10, which is placed furthest outwards in the radial direction, has a larger radius and a larger circumference or a larger arc length, respectively, as compared to all the further busbars 11.1, 11.2, 11.3. In addition, the open circular arc of the circular arc-shaped part of this busbar 10 has a substantially larger center point angle and consequently also a larger circumferential angle than the open circular arcs of the other busbars 11.1, 11.2 and 11.3. Altogether, a total of twelve radially outwardly projecting connection elements 12 are uniformly distributed along the circumference or the arc length of the busbar 10, respectively, on the outer busbar 10. The busbar 10 is connected at one side of each of the total of twelve coils at the correspondingly placed wire end of the coil. According to FIG. 2, each connection element 12 of the outer busbar 10 has a fork-shaped end, the wire end 6a being received in the fork-shaped end of the connection element 12 when it is connected to the busbar 10. With respect to the winding direction of the coils, this is always the same wire end 6a of a coil; according to the representation in FIG. 2 this is always the right wire end 6a. In this way, the outer busbar 10 forms a so-called star point connection for all twelve coils of the stator. This means that this busbar 10 is designed in such a way that it connects each coil of each phase to each other coil.

The three other busbars 11.1, 11.2, 11.3 positioned further inward in the radial direction are used to create a connection associated with a phase 4.1; 4.2; 4.3. These busbars 11.1, 11.2, 11.3 are designed in such a way that they each create the connection of all coils of a phase, so that the coils can be operated simultaneously. For this purpose, each of these busbars 11.1, 11.2, 11.3 has four radially outwardly projecting connection elements 13.1; 13.2; 13.3 being uniformly distributed along the circumference or the arc length of the circular arc-shaped region of the corresponding busbar 11.1; 11.2; 11.3, respectively. These connection elements 13.1, 13.2, 13.3 are in each case formed longer in the radial direction than each of the total of twelve connection elements 12 of the outer busbar 10. According to the embodiment shown in FIG. 2, the busbars 11.1, 11.2, 11.3 of the phases 4.1; 4.2; 4.3 each are designed in such a way and the connection elements 13.1; 13.2; 13.3 of each busbar 11.1; 11.2; 11.3 are distributed in such a way that respectively adjacent connection elements 13.1; 13.2; 13.3 of the individual busbar 11.1; 11.2; 11.3 are aligned at an angle of 90° to each other. The further inwards the respective busbar 11.1; 11.2; 11.3 is placed and the smaller the radius of the open circular arc of the busbar, the longer the radially projecting connection elements 13.1; 13.2; 13.3 have to be in order to create a connection to the wire end 6b, positioned on the left side, of a coil belonging to the respective phase 4.1; 4.2; 4.3.

For this purpose, the respective left wire end 6b of the coil is received in the fork-shaped end of the corresponding connection element 13.1; 13.2; 13.3 of one of the busbars 11.1, 11.2, 11.3 connecting the coils of a phase 4.1; 4.2; 4.3. Furthermore, these three busbars 11.1, 11.2, 11.3 are designed in such a way that they each allow for a connection to an electrical conductor for a connection to the motor drive control unit, the inverter. For this purpose, each of these busbars 11.1; 11.2; 11.3 has a radially inwardly directed connection part 14.1; 14.2; 14.3 of the respective phase for an electrical line element of an interface to a motor drive control unit, the connection part 14.1; 14.2; 14.3 having an annular connection end according to FIG. 2. The base plate 8 is designed in such a way that it provides, by means of depressions, corresponding circular arc-shaped receiving spaces for the busbars 10, 11.1, 11.2, 11.3, whose at least partially circular arc-shaped side walls 15a, 15b, 15c, 15d, 15e, as long as they are positioned between two adjacent busbars 11.1, 11.2; 11.2, 11.3 like the central side walls 15b, 15c, 15d, simultaneously serve as partition walls 15b, 15c, 15d between the respectively adjacent busbars. Furthermore, the base plate has corresponding receiving spaces 16.1, 16.2, 16.3 for the annular connection ends of the connection parts 14.1, 14.2, 14.3. In the plan view according to FIG. 2, the base plate itself essentially has a circular ring shape with an outer edge on which the removable outer ring 9 is located and an inner edge on which three convex projections directed inwards in the radial direction are formed. Each of these convex projections on the inner circumference of the base plate forms, together with a correspondingly curved section of the axially aligned inner side wall 15e, a receiving space 16.1; 16.2; 16.3 for the annular connection end of one of the connection parts 14.1; 14.2; 14.3.

Figure 3:
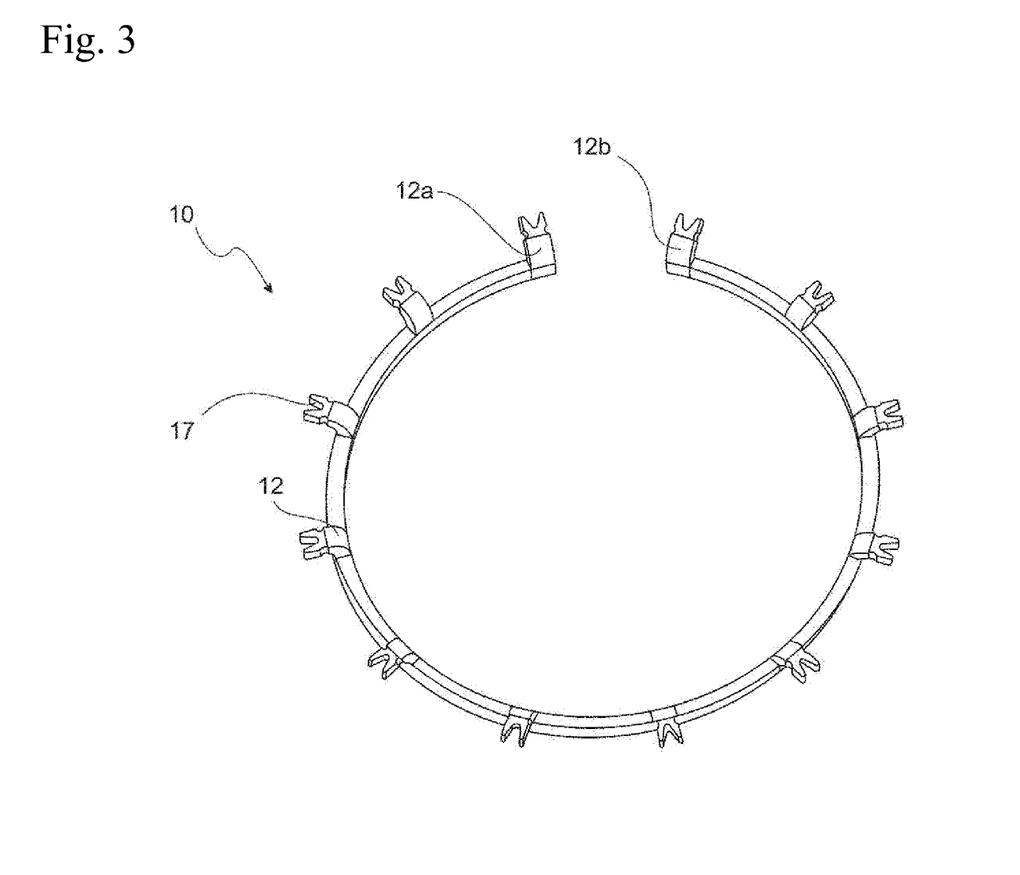
FIG. 3: shows a busbar for a star point connection.

FIG. 3 shows the busbar 10 for the star point connection as an individual part in a perspective view. The busbar 10 functions as the star point connection for the total of twelve coils, all of which are connected by this individual part. Accordingly, starting from the basic shape of the open circular arc, the busbar 10 is uniformly distributed along the circumference or the arc length of the busbar 10, respectively, and has a total of twelve radially outwardly projecting connection elements 12 with fork-shaped ends for receiving one wire end, respectively. The uniform distribution of the connection elements along the circular arc results in that in each case adjacent connection elements 12 of the busbar 10, including the connection elements 12a, 12b positioned opposite to each other on the two open ends of the circular arc, are aligned to each other at an angle of 30°. In the perspective view it can be seen that, starting from the upper side of the circular arc-shaped region of the busbar 10, the connection elements 12 change over a convex curvature directly adjoining the upper side of the busbar 10 as projections from an initially predominantly axial direction into a radial direction outwards. The fork-shaped ends 17 of the connection elements 12 are aligned in such a way that wire ends extending in the axial direction can be introduced into the fork-shaped ends 17 from below, i.e., originating from the coils in the stator core. In this case, the fork-shaped ends 17 are not positioned on the same plane as the circular arc-shaped region of the busbar 10, but rather slightly above it. The position of the connection elements 12 above the circular arc-shaped region of the busbar 10 facilitates the transfer of the connection elements 12 across one or more side walls or partition walls when the busbar is positioned in the receiving space of the base plate.

Figure 4:
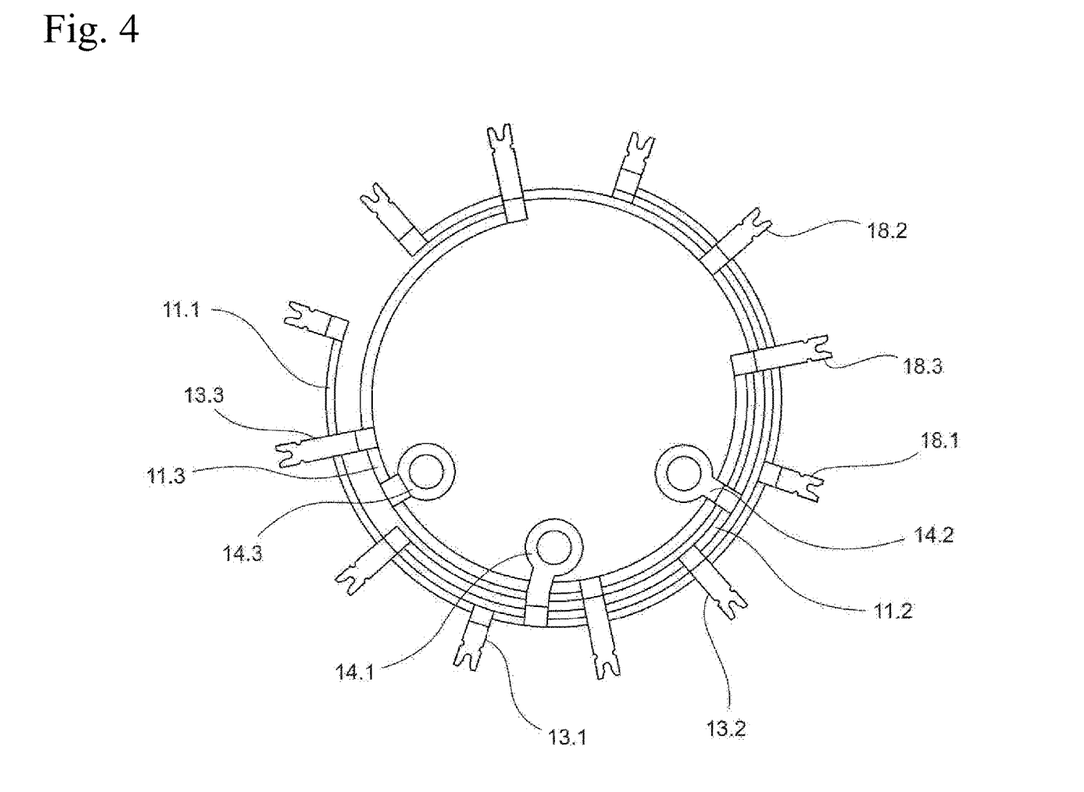
FIG. 4: shows three busbars for each coil of a phase, and a connection to an electrical conductor.

FIG. 4 shows a plan view of an arrangement of three busbars 11.1, 11.2, 11.3, each with four connection elements 13.1; 13.2; 13.3 for all four coils of a phase, each phase also having a connection part 14.1; 14.2; 14.3 for connection to an electrical conductor. The busbars 11.1, 11.2, 11.3 shown in FIG. 4 are designed in such a way that they each create a connection associated with a phase and, in doing so, can connect all coils of a phase to each other in order to operate these coils simultaneously. For this purpose, each of these busbars 11.1, 11.2, 11.3, as already mentioned, has the shape of an open circular arc with the radially outwardly projecting connection elements 13.1, 13.2, 13.3. The circular arc-shaped regions of the busbars 11.2, 11.2, 13.3 have the same center point, wherein the radii of the circular arc shapes of the various busbars 11.1, 11.2, 11.3 are differing. The smaller the radius of a busbar 11.1; 11.2; 11.3, the longer the connection elements 13.1, 13.2, 13.3 are in the radial direction. In addition, the circular arc-shaped regions of the various busbars 11.1, 11.2, 11.3 are arranged offset from each other in the circumferential direction or in the arc direction, respectively. Both results in an arrangement of a total of twelve fork-shaped ends 18.1, 18.2, 18.3 of the connection elements 13.1, 13.2, 13.3 being uniformly distributed along a circumference of an imaginary circular arc with a circumferential angle of 360°.

The connection elements 13.1, 13.2, 13.3 each are shaped in such a way so that, starting from the upper side of the circular arc-shaped region of the respective busbar 11.1; 11.2; 11.3, they change over a convex curvature directly adjoining the upper side of the respective busbar 11.1; 11.2; 11.3 as projections from an initially predominantly axial direction into a radial direction outwards. The fork-shaped ends 18.1, 18.2, 18.3 of the connection elements 11.1, 11.2, 11.3 are aligned in such a way that wire ends extending in the axial direction can be introduced into the fork-shaped ends 18.1, 18.2, 18.3 from below, i.e., originating from the coils in the stator core. In this case, the fork-shaped ends 18.1, 18.2, 18.3 are not positioned on the same plane as the circular arc-shaped region of the respective busbar 11.1; 11.2; 11.3, but rather above it. The position of the connection elements 13.1, 13.2, 13.3 above the circular arc-shaped regions of the busbar 11.1, 11.2, 11.3 facilitates the transfer of the connection elements 13.1; 13.2; 13.3 over one or more side walls or partition walls and other busbars 10, 11.1, 11.2, 11.3, if all busbars 10, 11.1, 11.2, 11.3 are positioned in the receiving space of the base plate.

The busbars shown in FIG. 4 each have, as a further connecting element, a radially inwardly directed connection part 14.1; 14.2; 14.3 with an annular end. This provides an annular connection for each phase, each allowing for a connection of this phase to an electrical line element which can be connected to the motor drive control unit, the inverter. The three connection parts 14.1; 14.2; 14.3 are only distributed over a region of less than half the inner circumference of the base plate. The connection part 14.1 of the busbar, which in the representation of FIG. 4 is positioned furthest outside and whose circular arc region has the greatest radius here, is centrally placed within this arrangement.

Figure 5:
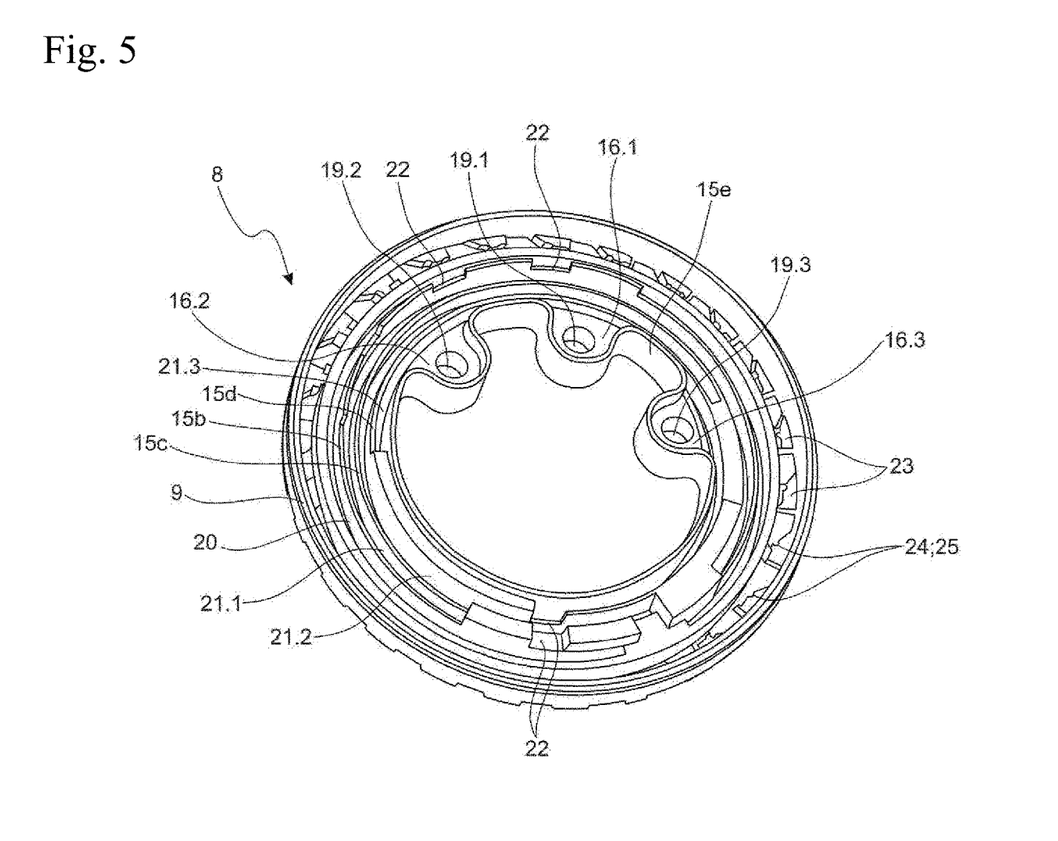
FIG. 5: shows a base plate with an outer ring.

FIG. 5 shows a perspective view of the base plate 8 together with the outer ring 9. The base plate 8 fulfills the function of a support element for the aforementioned busbars and for the electrical line elements for connection to the inverter.

The base plate 8 has essentially a circular ring shape with an outer edge on which the outer ring 9 is placed and with an inner edge on which three convex projections directed inwards in the radial direction are formed. Each of these convex projections on the inner circumference of the base plate forms, together with a correspondingly curved section of the inner side wall 15e, a receiving space 16.1; 16.2; 16.3 for the annular connection end of a connection part for connecting a phase to a respective line element not shown in FIG. 5, which is provided as an interface to a motor control unit. Within each receiving space 16.1; 16.2; 16.3, a circular hole 19.1; 19.2; 19.3 passing through the base plate for receiving the respective line element is formed. The three receiving spaces 16.1, 16.2, 16.3 are only distributed over a region of less than half the inner circumference of the base plate. The receiving space 16.1 positioned in the center is provided for the annular connection end of the busbar that has the largest radius of the circular arc-shaped region out of the three busbars having a corresponding connection end, and is accordingly also placed at the furthest outside.

A total of four circular arc-shaped receiving spaces 20, 21.1, 21.2, 21.3 for the busbars 10, 11.1, 11.2, 11.3, whose circular arc shapes have the same center point, is formed in the base plate 8. A first, outer receiving space 20 is provided for the outer busbar 10 (cf. FIG. 2). A second receiving space 21.1 that is adjacent radially on the inside to the first receiving space 20 and is formed for receiving a busbar for connecting the coils of a phase describes a circular arc that has a smaller center angle and thus also a smaller circumferential angle than the circular arc of the first receiving space 20, resulting in that the first circular arc-shaped receiving space 20 is not positioned along the entire arc length next to the second receiving space 21.1, which also is circular arc-shaped. In the region in which the receiving spaces 20, 21.1 are positioned adjacent to each other, these are separated from each other and spaced apart by the circular arc-shaped partition wall 15b. A further third receiving space 21.2 that is adjacent radially on the inside to the second receiving space 21.1 and is provided for receiving a further busbar for connecting the coils of a phase is arranged offset in the circumferential direction or arc direction relative to the second receiving space 21.1, so that the circular arc-shaped receiving spaces 21.1 and 21.2 are not positioned next to each other along the entire arc length. In the region in which the second receiving space 21.1 and the third receiving space 21.2 are positioned adjacent to each other, these are separated from each other and spaced apart by the circular arc-shaped partition wall 15c. A further fourth receiving space 21.3 that is adjacent radially on the inside to the third receiving space 21.2 and is provided for receiving a further busbar for connecting the coils of a phase is arranged offset in the circumferential direction or arc direction relative to the third circular arc-shaped receiving space 21.2 and relative to the second receiving space 21.1. In the region in which the third receiving space 21.2 and the fourth receiving space 21.3 are positioned adjacent to each other, these are separated from each other and spaced apart by the circular arc-shaped partition wall 15d.

In addition, numerous depressions for the radially aligned connection elements and for radially aligned sections of the connection parts are formed in the base plate, these depressions each being formed by an essentially rectangular recess 22 in a side wall 15a; 15b; 15c; 15d or several spaced recesses 22 arranged one after the other in the radial direction and essentially being rectangular are formed in several partition walls 15a, 15b, 15c, 15d. Some recesses 22 are also provided for placing radially aligned regions of the connection parts, which serve to connect a phase to an electrical line element.

For connection to the base plate 8, the outer ring 9 has, at its lower edge, radially inwardly projecting latching elements 23 regularly distributed over the whole circumference and having a substantially trapezoidal surface with an inwardly decreasing width. The latching elements 23, however, each have a concave curvature 24 at one of their edges, which, together with a recess in the base plate, provides a feed-through opening 25 for a wire end of a coil of the stator.

Figure 6:
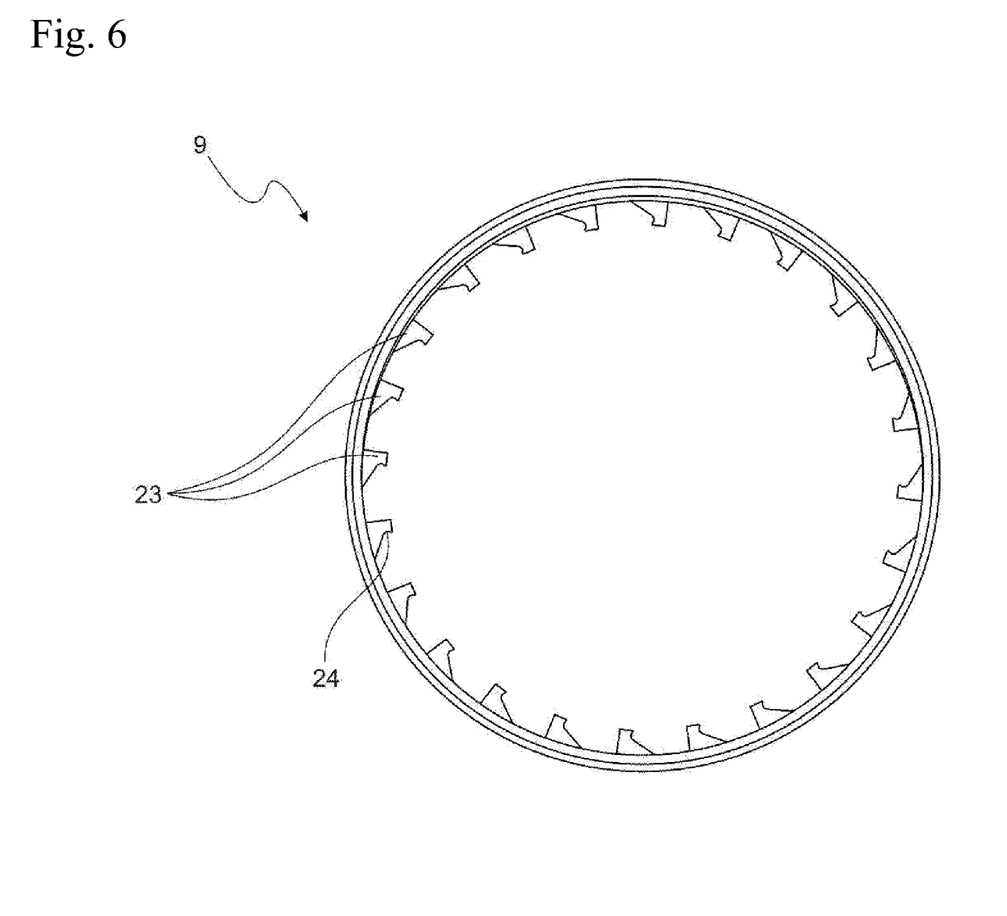
FIG. 6: shows the outer ring as a single part remote from the base plate.

FIG. 6 shows the outer ring 9 as a single part remote from the base plate in plan view. The outer ring 9 is designed as a part which can be removed from the base plate so that the wires can be guided to the busbars. After assembly of the coil connecting ring, the outer ring 9 also acts as a boundary wall for resin potting the entire region.

Since the concave curvatures 24 together with corresponding opposite regions of the base plate form feed-through openings for the axially aligned wire ends, also the number of latching elements 23, which are distributed regularly along the whole circumference of the outer ring 9 and project radially inwards, corresponds to the number of twice the number of coils and thus to the total number of wire ends of the coils, totaling twenty-four.

Figure 7:
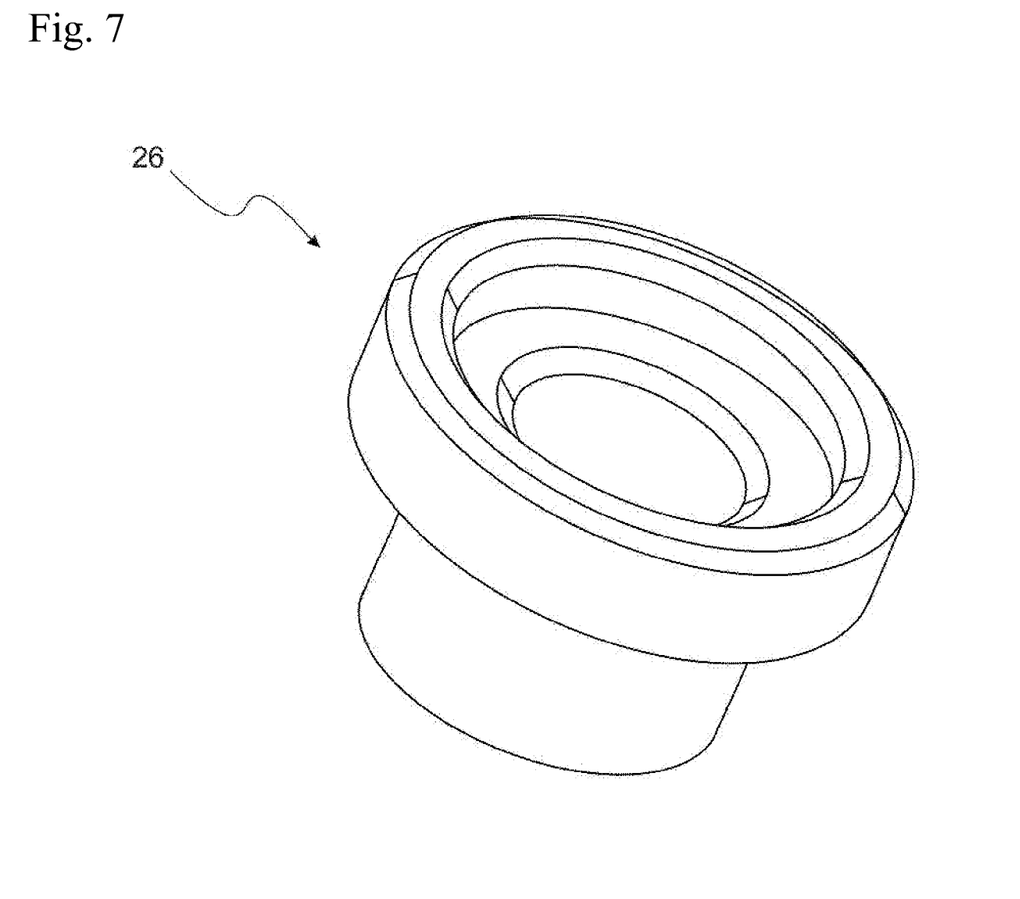
FIG. 7: shows a sealing tube for an electrical connecting pin (E-Pin)

FIG. 7 shows a sealing tube 26 for an electrical connecting pin. The electrical connecting pin (E-pin), which is not shown in FIG. 7, is an embodiment of an electrical line element and is seated in one of the sealing tubes 26. The effect of the sealing tubes 26 is to insulate the electrical connecting pin (E-pin) within the hermetically sealed environment and to provide a seating area for an O-ring for sealing the inside of the hermetically sealed environment to the inverter.

Figure 8:
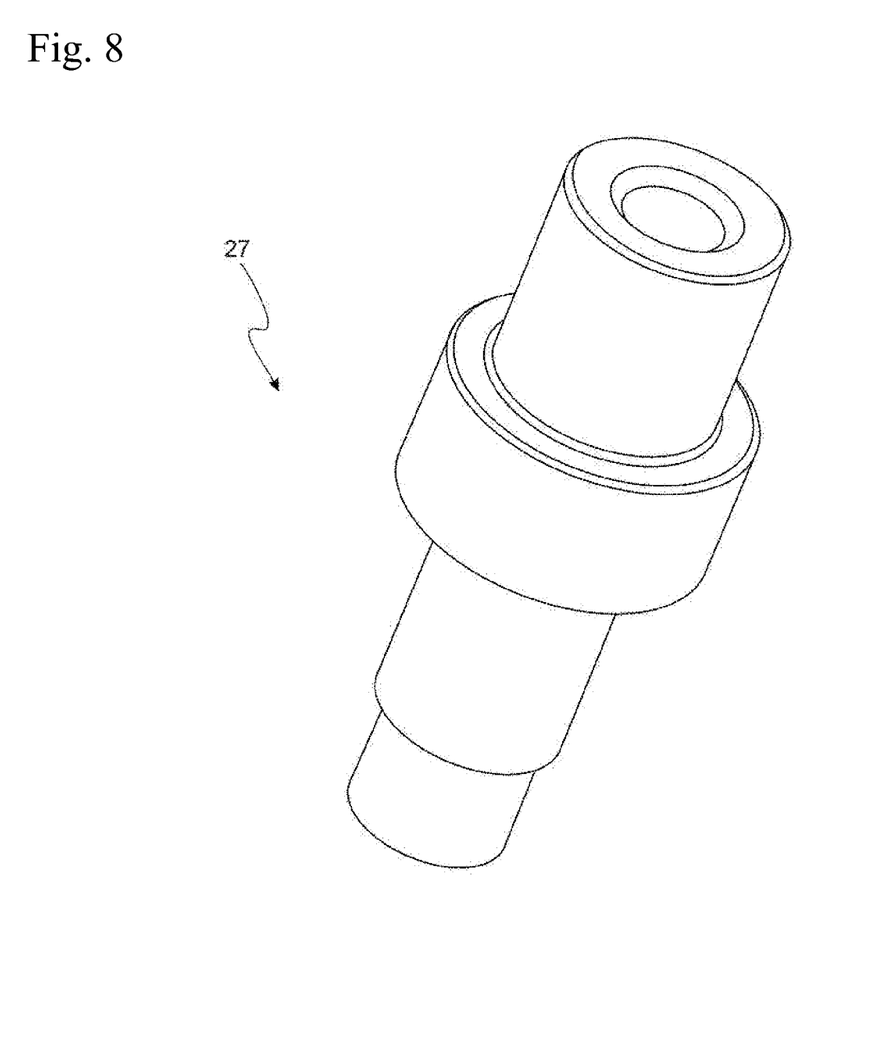
FIG. 8: shows an electrical connecting pin (E-Pin) as an electrical line element.

One of the electrical connecting pins 27 (E-pin) is presented in FIG. 8. The E-pin 27 is an electrical conductor representing the interface between the stator and the motor drive system, i.e., the inverter.

Figure 9:
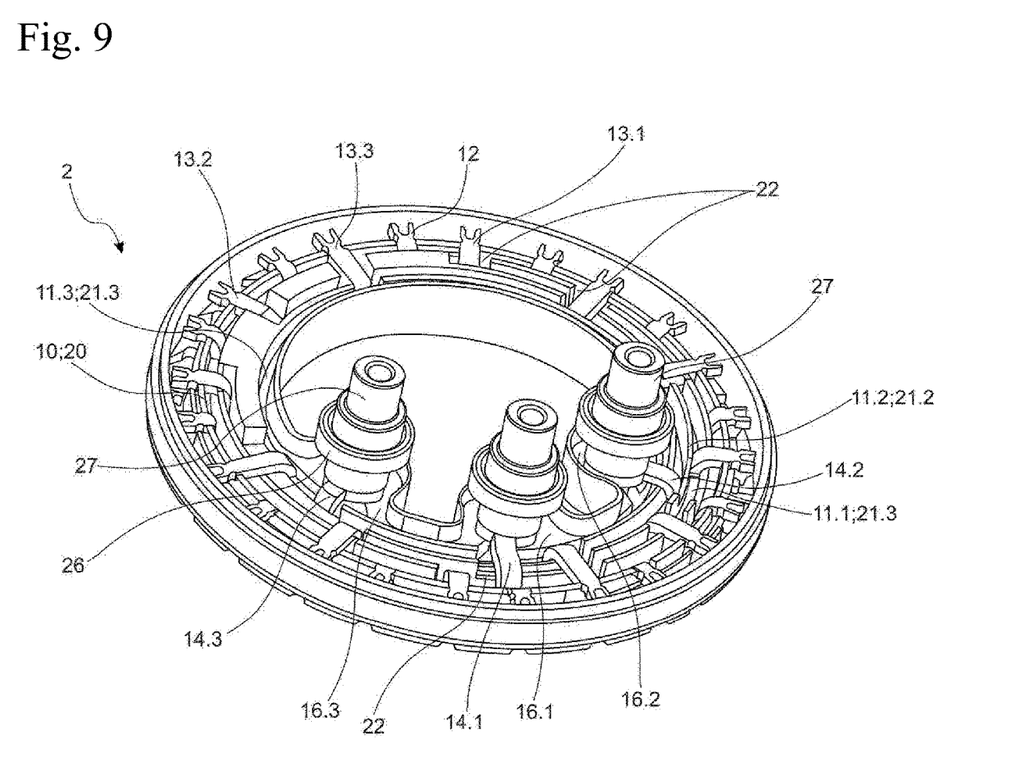
FIG. 9: shows a perspective representation of the coil connecting device without potting material and with attached line elements as an interface to a motor control unit.

FIG. 9 shows a perspective view of the whole coil connecting device 2 without potting and without wire ends, in contrast to FIG. 5, which shows a corresponding perspective view of the base plate 8 together with the outer ring 9, but with inserted busbars 10, 11.1, 11.2, 11.3, sealing tubes 26 and electrical connecting pins 27. The base plate 8 as a support element for the busbars 10, 11.1, 11.2, 11.3 and for the connecting pins 27 for connection to the inverter has both the necessary depressions 20, 21.1, 21.2, 21.3 and recesses 22 for the support and mutual spacing of the electrically conductive busbars 10, 11.1, 11.2, 11.3, connection elements 12, 13.1, 13.2, 13.3 or connection parts 14.1, 14.2, 14.3 as well as the necessary receiving spaces 16.1, 16.2, 16.3 for the annular ends of the connection parts 14.1, 14.2, 14.3 and the connecting pins 27 as electrical line elements. In this way, the coils can be connected simultaneously via a star connection and the coils of each phase, while sufficient space is secured and the full insulation between each current-carrying part is ensured.

Figure 10:
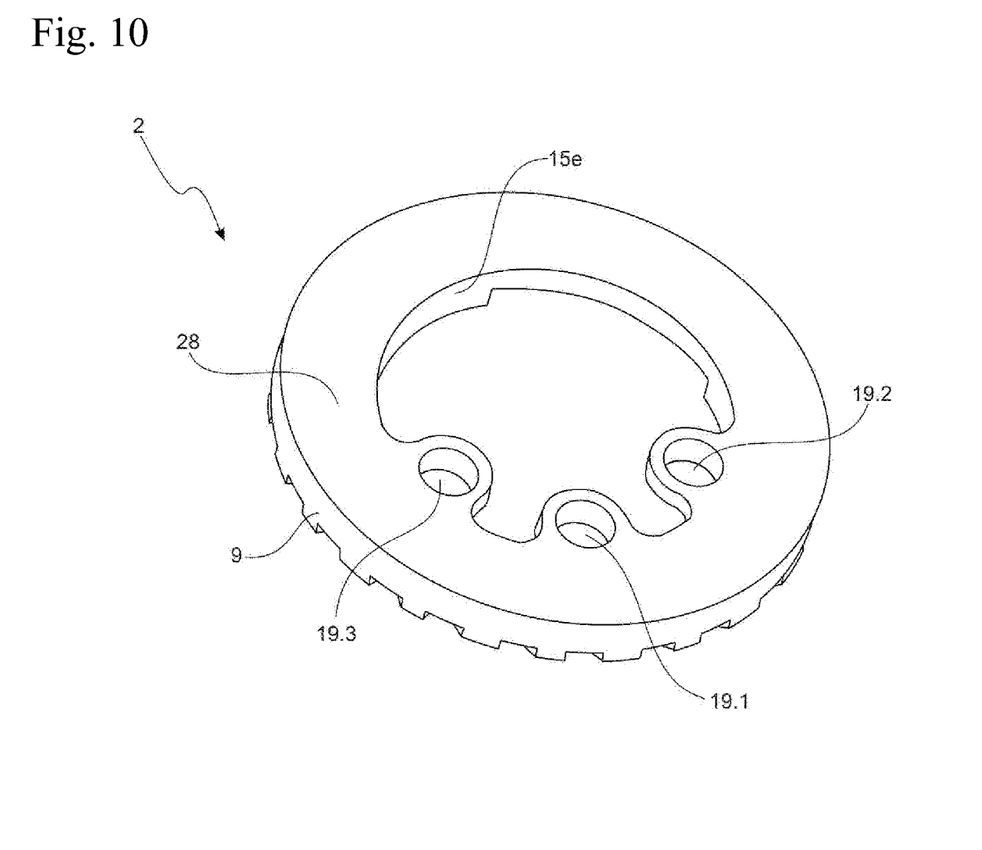
FIG. 10: shows the coil connecting device after potting.

FIG. 10 shows the coil connecting device 2 after the potting material 28 has been cast into a pre-mounted floating coil connecting ring after winding in order to insulate the components from the refrigerant and also from each other. Potting strengthens the connecting points between the individual current-carrying elements. The holes 19.1, 19.2, 19.3 for receiving a line element are kept free in this case. In addition, the outer ring 9 acts as an outer boundary wall for resin potting the entire region enclosed by the outer ring. The inner side wall 15e acts as the inner boundary wall for the resin potting.

Figure 11:
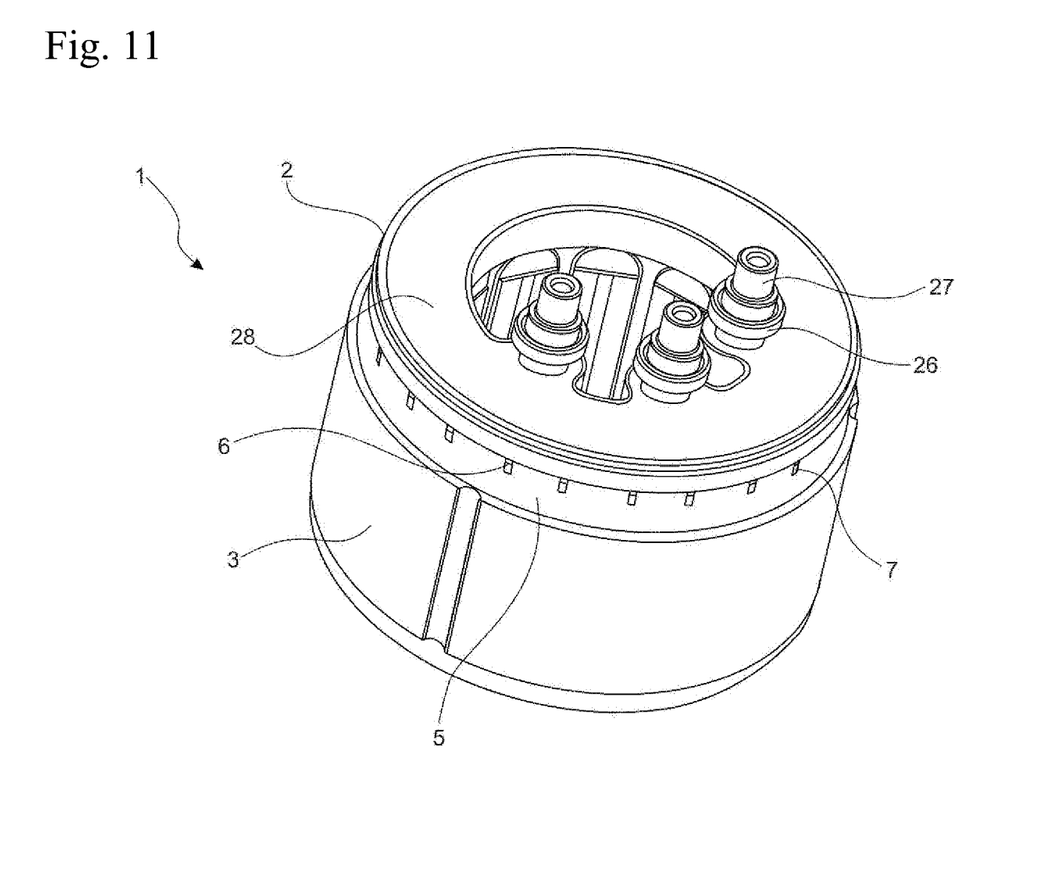
FIG. 11: shows a perspective representation of the finished stator with the coil connecting device after potting and with line elements as an interface to the motor control unit.

A perspective representation of the complete finished stator 1 with the cylindrical stator core 3 and the coil connecting device 2, filled with potting material 28, is shown in FIG. 11. In this case, three connecting pins 27, each of which is inserted into a sealing tube 26, are introduced together with the sealing tubes 26 into the potted coil connecting device, so that they are electrically connected to the connection parts of the busbars of the individual phases. The coil connecting device 2 in the form of the illustrated embodiment of the coil connecting ring 2 is linked on the wire ends 6 of the wound coils axially projecting the base insulation 5. The correspondingly resulting gap 7 between the base insulation 5 and the coil connecting device 2 allows for axial tolerance compensation. At the same time, this type of fastening also produces a lateral tolerance compensation.

LIST OF REFERENCE NUMERALS 1 stator
2 coil connecting device, coil connecting ring
3 stator core
4 coil
4.1 phase, coils of a phase
4.2 phase, coils of a phase
4.3 phase, coils of a phase
5 base insulation
6 wire end
6a wire end (for star point connection)
6b wire end (for phase connection)
7 gap
8 base plate
9 outer ring
10 busbar, star point connection
11.1 busbar
11.2 busbar
11.3 busbar
12 connection element
12a connection element at the open circular arc end
12b connection element at the open circular arc end
13.1 connection element
13.2 connection element
13.3 connection element
14.1 connection part
14.2 connection part
14.3 connection part
15a side wall
15b side wall, partition wall
15c side wall, partition wall
15d side wall
15e side wall, inner side wall
16.1 receiving space
16.2 receiving space
16.3 receiving space
17 fork-shaped end of busbar 10
18.1 fork-shaped end of busbar 11.1
18.2 fork-shaped end of busbar 11.2
18.3 fork-shaped end of busbar 11.3
19.1 hole for receiving a line element
19.2 hole for receiving a line element
19.3 hole for receiving a line element
20 receiving space for busbar 10
21.1 receiving space for busbar 11.1
21.2 receiving space for busbar 11.2
21.3 receiving space for busbar 11.3
22 recess in a side wall
23 latching elements of the outer ring 9
24 concave curvature of a latching element 23
25 feed-through opening for a wire end
26 sealing tube
27 line element; electrical connecting pin; E-pin
28 potting material

The invention claimed is:

1. A stator of an electric motor for driving a refrigerant compressor, comprising:
a stator core having a substantially hollow-cylindrically shaped stator yoke having coils arranged uniformly distributed on its inner side along its circumference and directed radially inwards with respect to its cross section, wherein conductor wires are wound to create the coils which are divided into at least three phases, and wherein a base insulation is formed between the stator core and the wound coils, and wherein each of the wound coils or, if several of the coils are connected in series in a coil strand, the coil strand has two wire ends projecting from the base insulation of the stator in an axial direction relative to a cylinder axis of the stator yoke, and
a coil connecting device with
a base plate as a support element for connecting elements, and
one of first connecting elements installed on the base plate, which is linked via connection elements to a first wire end of each of the coils or the coil strand and thus connects all of the coils or the coil strand to each other, and further connecting elements installed on the base plate, each having connection elements, which are linked to a second wire end of the coils or the coil strand of a phase and thus connect all of the coils or the coil strand of the phase to each other, wherein the coil connecting device is linked on the first wire end and the second wire end of the wound coils or the coil strand in such a way that a gap remains between the base insulation and the coil connecting device, wherein the base plate has a circular ring shape with an outer edge to which a removable outer ring delimiting a circumference of the coil connecting device is attached.

2. The stator according to claim 1, wherein each of the connecting elements, which are each connecting the coils or the coil strand of the phase to each other, has a connection part for a connection of the same phase to a line element forming an interface to a motor control unit.

3. The stator according to claim 1, wherein the coil connecting device is filled with potting material to insulate electrically conductive components from a refrigerant and also from each other.

4. The stator according to claim 1, wherein the first connecting element is formed as a busbar having a shape of an open circular arc and, distributed uniformly along its circumference or arc length, having several radially outwardly projecting ones of the connection elements with outer ends for each receiving the first wire end of one of the coils, a total number of the ones of the connection elements of the busbar corresponding to a total number of the coils or the coil strand of the stator.

5. The stator according to claim 4, wherein the further connecting elements are formed as busbars each having a shape of an open circular arc and, distributed uniformly along its circumference or arc length, having several radially outwardly projecting ones of the connection elements with outer ends for each receiving the second wire end of one of the coils, a total number of the ones of the connection elements corresponding to a respective one of the busbars of the total number of coils or the coil strand of the phase.

6. The stator according to claim 5, wherein radii of the circular arc shapes of the busbar of the first connecting element and the busbars of the further connecting elements differ and the busbar of the first connecting element and the busbars of the further connecting elements are arranged such that the circular arc shapes of the busbar of the first connecting element and the busbars of the further connecting elements either have a same center point or center points of the circular arc shapes are positioned at least on a same axis perpendicular to a plane of the circular arc shape.

7. The stator according to claim 1, wherein the base plate is designed such that it provides separate receiving spaces for receiving and supporting the connecting elements and, if appropriate, also receiving spaces for connection parts for connecting to line elements of an interface to a motor drive control unit.

8. The stator according to claim 1, wherein, in this case, the wire ends are passed through between the outer edge of the base plate and the outer ring, so that an electrical connection of the wire ends to the connecting elements positioned on the base plate is possible.

9. The stator according to claim 1, wherein the base plate has an inner edge on which a number of radially inwardly directed convex projections corresponding to a number of phases are formed, each of the convex projections on an inner circumference of the base plate together with a correspondingly curved portion of an inner side wall forming a receiving space for an annular connection end of a connection part for an electrical line element of an interface to a motor drive control unit.

* * * * *